United States Patent [19]

Rausche et al.

[11] Patent Number: 5,355,715
[45] Date of Patent: Oct. 18, 1994

[54] STRAIN TRANSDUCER CALIBRATION DEVICE

[75] Inventors: Frank Rausche, Chagrin Falls; Dean A. Cotton, Brunswick Hills Township, Medina County; Paul T. Kicher, Euclid, all of Ohio

[73] Assignee: Pile Dynamics, Inc., Cleveland, Ohio

[21] Appl. No.: 905,727

[22] Filed: Jun. 29, 1992

[51] Int. Cl.$^5$ .................................. G01L 1/22
[52] U.S. Cl. ........................................ 73/1 B
[58] Field of Search ............... 73/1 B, 1 D; 33/DIG. 13

[56] References Cited

U.S. PATENT DOCUMENTS

| | | | |
|---|---|---|---|
| 2,720,111 | 10/1955 | Clark | 73/1 B |
| 4,314,481 | 2/1982 | Wolfer et al. | 73/781 |
| 4,967,485 | 11/1990 | Brown et al. | 33/787 |

OTHER PUBLICATIONS

"A Method of Determining the Transient Response of a Strain Gauge", G. Abramchuk, A. P. Vashchenko, and G. V. Stepanov; Strength Mater (USA); vol. 10, No. 10; pp. 1216–1218; 1978.
"Strain Gauge Calibration Device for Extreme Temperatures", McClintock; The Review of Scientific Instruments; vol. 30, No. 8; pp. 715–718; 1959.
Strain–Gage Calibrator; AMINCO; 1955.

Primary Examiner—Hezron E. Williams
Assistant Examiner—Daniel S. Larkin
Attorney, Agent, or Firm—Fay, Sharpe, Beall, Fagan, Minnich & McKee

[57] ABSTRACT

A device for calibrating strain gages and strain transducers. The device includes an assembly with a first section and a second section positioned in relation to each other such that a gap is defined between the two sections. A strain transducer is attached to the assembly across the defined gap. The assembly includes an adjustment device which alters the position of the sections in relation to each other, thereby redefining the gap. A displacement sensor detects a displacement signal occurring due to the redefining of the gap caused by operation of the adjustment device. A strain transducer output detector detects a strain output signal occurring also due to the redefining of the gap by the adjustment device. A calibrating device inputs the signals from the displacement sensor and the strain transducer output detector and provides a calibration for the strain transducer attached to the assembly.

26 Claims, 8 Drawing Sheets

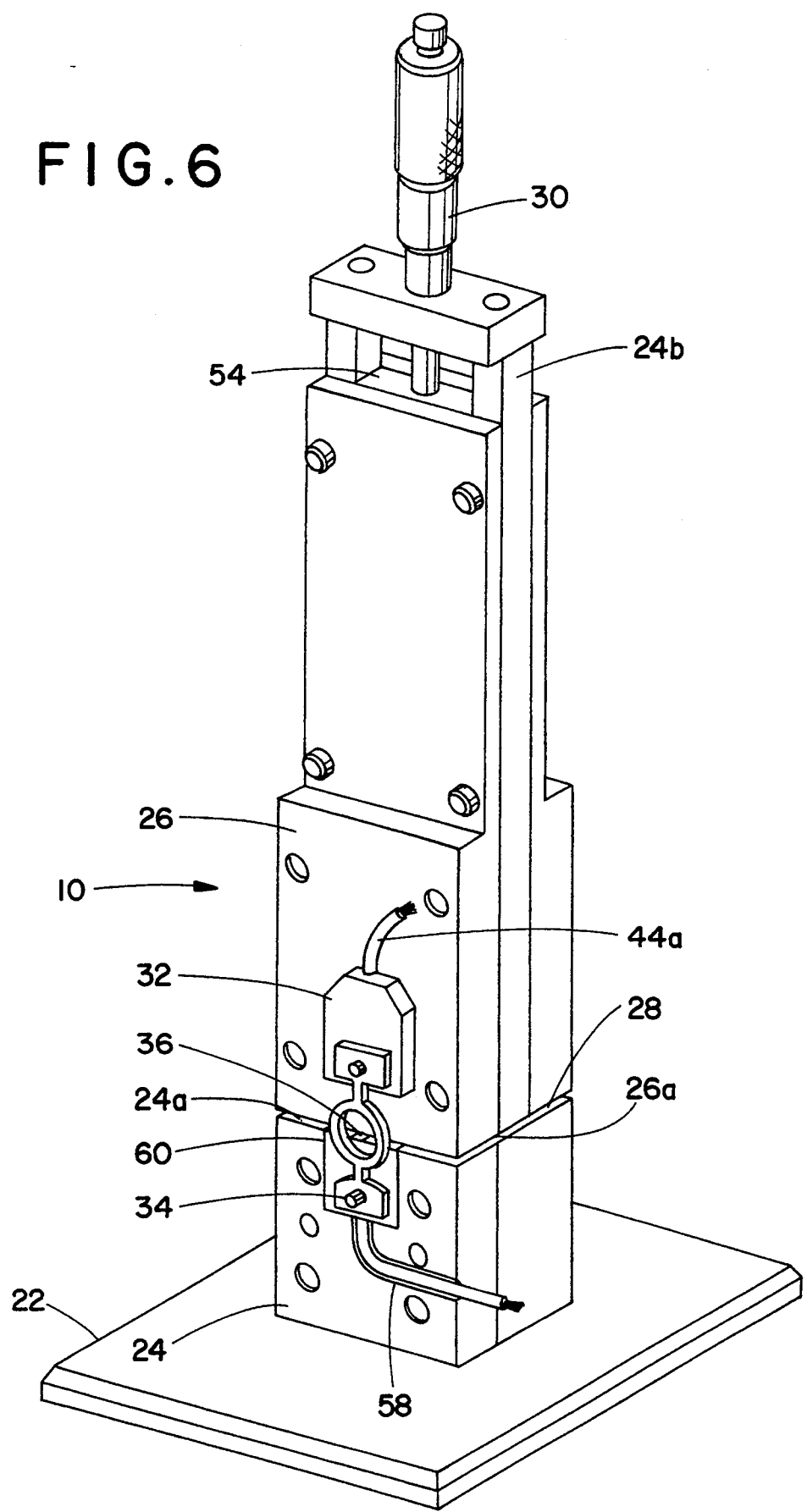

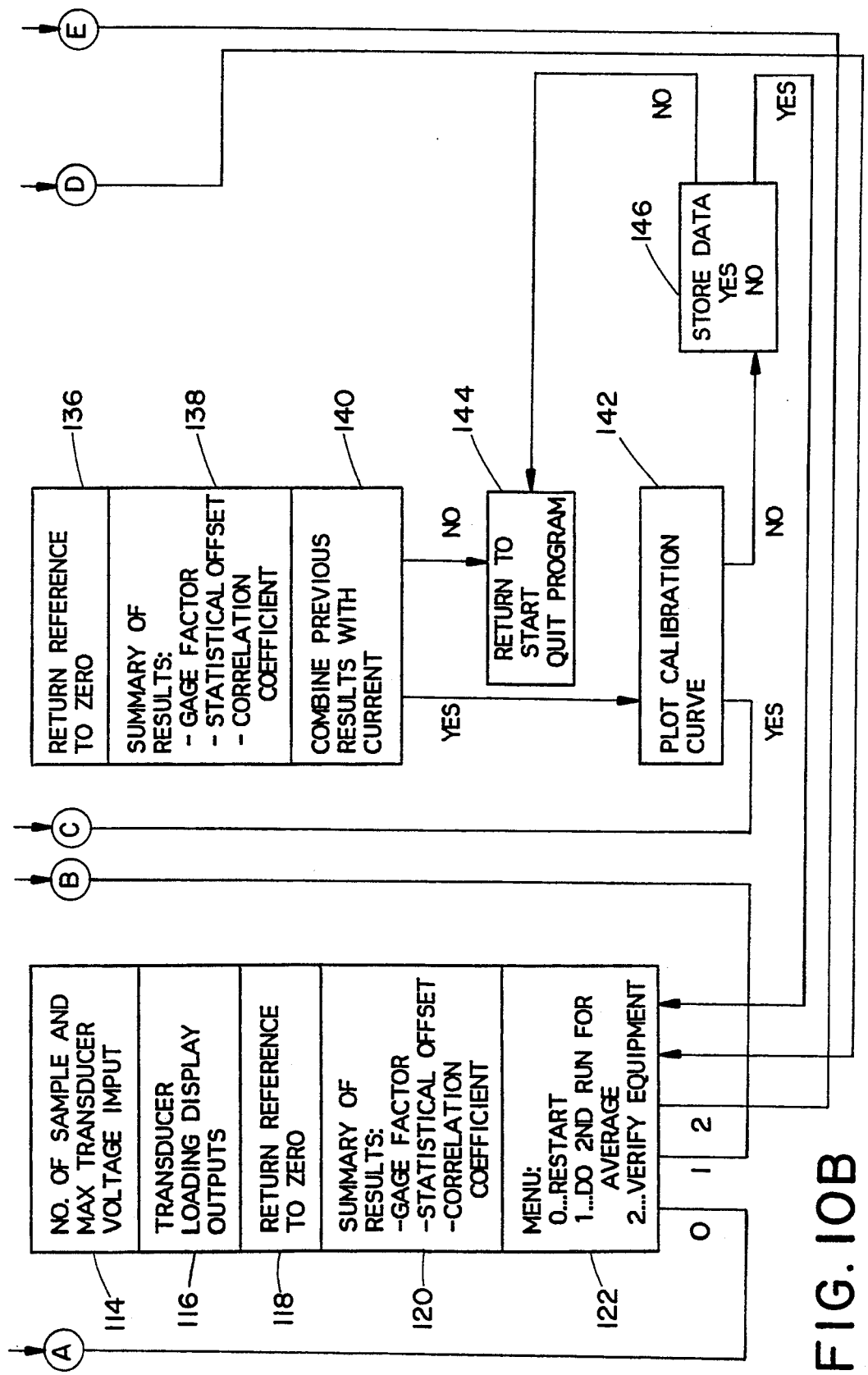

STRAIN TRANSDUCER CALIBRATION DEVICE

BACKGROUND OF THE INVENTION

The present invention relates generally to transducer calibration. More particularly, it relates to a device used for calibration of a strain gage arrangement. However, it is to be appreciated that the invention has broader applications and may be advantageously adopted for use in other environments as well.

In the construction industry, it is important to know the soil characteristics of an area where a structure is to be constructed. One procedure for obtaining information on soil characteristics is achieved in conjunction with driving a pile into the soil. Such piles are driven to form building foundations. It is difficult to determine a suitable depth to which a pile must be driven, as well as to determine the number of piles necessary to sustain a desired structure.

To address these concerns, a strain transducer is attached to the pile. A strain transducer is a device which may be attached to a structure, pile, or other mechanical object undergoing stress and strain to convert variations of strain to linearly related variations in voltage. Attachment may be obtained by bolting, gluing, welding, riveting, or other means.

The strain transducer is calibrated such that outputs from the transducer signify a stress exerted by a driving force such as a driving hammer as well as the response from the soil during hammer blows. For the results of such a procedure to be reliable, the strain transducer must be accurately calibrated and the operators of the pile driving tests be aware of the characteristics of the strain transducer being used.

Since the reliability of the characteristics of the strain transducer are essential to obtaining accurate soil condition information results, industry and governments are becoming more demanding that accuracy of the strain transducers be verified. Therefore, more frequent recalibration of the strain transducers and a more precise calibration is required.

A prior art device used to calibrate strain gages and strain transducers is represented by FIG. 1. In this device, a tube 12, possibly made of steel is placed between a high pressure manual jack 14. A strain transducer 10 to be calibrated is attached to the metal tube. Thereafter, a top jack portion 16 and a bottom jack portion 18 are compressed to place pressure on the ends of the tube thereby compressing the tube 12 causing a change in output from the strain transducer 10. Readings of the strain transducer inside the calibrated steel tube are then correlated to the output of the strain transducer for development of characteristics of the strain transducer under test.

This prior art device requires a bulky, heavy-duty jack. Additionally, the precision of the strain applied to the strain transducer is difficult to measure and verify. Finally, calibration under this system is a time consuming process.

A more compact, higher precision calibrating device is desirable. Such a device should also be economical to manufacture, provide a verification of accuracy of the calibration results, and be of a sturdy overall construction. The subject invention achieves these needs and others.

SUMMARY OF THE INVENTION

In accordance with the subject invention, a calibration device is provided for calibrating strain gages and strain transducers, such as those used in connection with the driving of piles or test piles to obtain soil characteristic information, as well as to any type of strain measurement associated with a permanent structure under any live load condition. The following description assumes a vertical arrangement, however, gravity is not essential and a horizontal arrangement is also acceptable.

The device includes a base having a post attached to the base at its lower end and the post further having a flat top surface. A sliding block, which has a flat reflective bottom surface, is positioned in relation to the post's flat top surface such that a gap is defined between the flat reflective bottom surface of the sliding block and the flat top surface of the post. The device is further constructed such that the sliding block can be moved in relation to the post, thereby redefining the dimensions of the gap. A screw device, advantageously a micrometer, is attached to the upper surface of the sliding block. Operation of the micrometer alters the gap defined by the flat surfaces.

A displacement sensor such as an optical sensor is arranged in the assembly to detect alteration of the gap caused by operation of the micrometer. The optical sensor develops an output signal which represents an alteration of the gap. An upper attachment is connected to the sliding block and a lower attachment is connected to the post. The attachment devices hold the strain transducer to be calibrated. A strain transducer output device outputs a signal from the strain transducer when the gap is altered by operation of the micrometer. Strain is applied to the strain transducer during operation of the micrometer since the strain transducer is attached across the gap which is being altered. An optical sensor conditioning circuit and a strain transducer conditioning circuit conditions the signals output by the optical sensor and the strain transducer respectively. These conditioned signals are input into a converter and ultimately a computer to achieve calibration of the strain transducer.

In accordance with a more limited aspect of the invention, the strain transducer is formed from a plurality of strain gages assembled in a bridge circuit.

In accordance with another feature of the invention, the micrometer used to move the sliding block, which in turn alters the defined gap, is further used to record the displacement of the sliding block and verify the output of the displacement sensor.

In accordance with another aspect of the invention, the adjustment of the sliding block proceeds from a starting position of no strain on the strain transducer to one of maximum strain on the transducer, whereby a plurality of sampling points from the optical sensor and the strain transducer are taken.

In still yet another aspect of the invention, it is possible to select whether the calibration of the strain transducer is an initial calibration for that transducer or whether it is a subsequent calibration.

A principle advantage of the present invention is the provision of a strain transducer calibration system in which a high degree of reliability and repeatability in calibration is achieved.

Another advantage of the present invention is the provision of a strain transducer calibration system employing redundancy checking of displacement by using both optical sensor and micrometer readings.

Yet another advantage of the present invention is the provision of a compact, economical calibration device.

Yet a further advantage of the present invention is the provision of a strain transducer calibration system with a sturdy overall construction facilitating its use in a wide range of environments.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIG. 6 is an expanded view of the elements of the device surrounding the gap;

DETAILED DESCRIPTION OF THE PREFERRED EMBODIMENT

Figure 2:
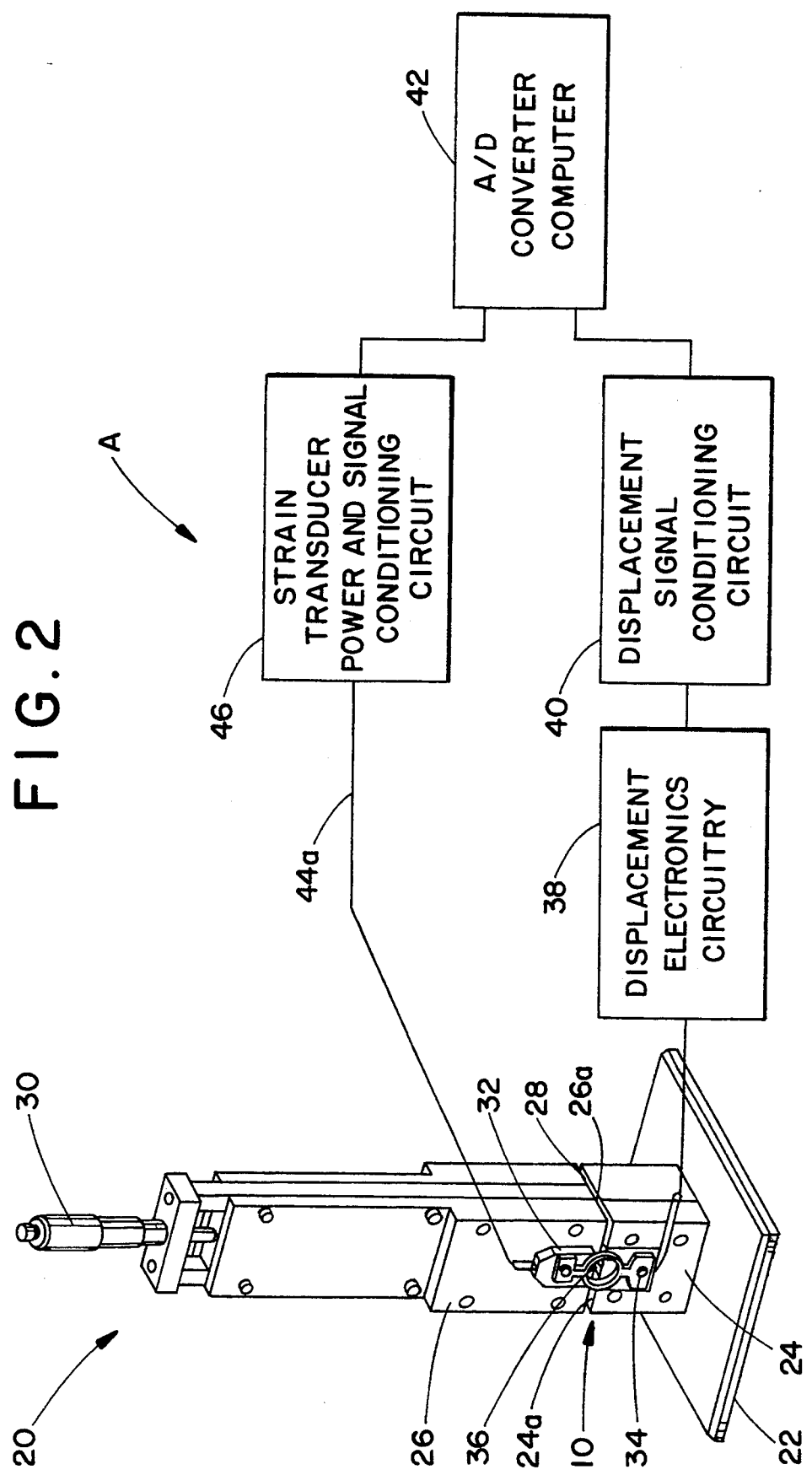
FIG. 2 is a sketch of the subject calibration device.

Referring now to the drawings, wherein the showings are for purposes of illustrating a preferred embodiment of the invention only and not for purposes of limiting same, FIG. 2 shows a strain transducer calibration device A for calibrating a strain transducer 10. An assembly 20 which is also shown in FIG. 6, is provided for holding the strain transducer 10 to be calibrated. The assembly includes a rectangular base portion 22. The base portion 22 is attached to a lower section or post 24 at its lower end. The post 24 has a flat surface 24a at its upper end. Located immediately above the flat surface 24a is an upper section also called sliding block 26. The lower end of sliding block 26 includes a flat, reflective surface 26a located immediately above flat surface 24a of post 24. The positions of post 24 and sliding block 26 define a gap 28.

Attached to the upper end of sliding block 26 is an adjustment device such as a micrometer 30. Operation of micrometer 30 causes movement of the sliding block. This movement of sliding block 26 alters the dimensions of gap 28. Additional discussion of the movement of sliding block 26 will be set forth in conjunction with FIG. 5.

With continuing attention to FIG. 2 in conjunction with FIG. 6, an upper attachment arrangement 32 is connected to sliding block 26 above gap 28 and a lower attachment arrangement 34 is connected to post 24 on the opposite side of gap 28. A displacement sensor 36, such as a Series 88RC Fiber Optic Displacement Sensor from PHILTEC of Arnold, Maryland, is included in the post 24 in order to detect movement of sliding block 26. Displacement sensor 36 is arranged in assembly 20 such that it uses reflective surface 26a of sliding block 26 for obtaining data on movement of the sliding block relative to a selected starting position. Displacement electronics 38, advantageously chosen for support of the PHILTEC sensor 88RC, receive signals supplied from displacement sensor 36 and converts them into signals useful by the remainder of the device. The output of displacement electronics 38 is transmitted to a displacement signal conditioning circuit 40 which conditions the signal for input to a calibration arrangement including an A/D convertor and computer 42. A more detailed explanation of displacement signal conditioning circuit 40 is associated with the discussion of FIGS. 8 and 9. In addition to the above discussed displacement sensor other commonly known displacement sensors may be used including, a linearly variable displacement transducer, a variable capacitance displacement sensor, a laser displacement sensor, a proximity switch or proximity sensor, and an accelerometer. When using the accelerometer it is noted that at least one of the sections is variable in time and a dummy transducer may be used as a reference for differentiating the measure displacement with respect to time.

Attached to sliding block 26 is a strain transducer output 44 which transmits the output developed by strain transducer 10 to a strain transducer line 44a. The output from the strain transducer 10 is supplied from line 44a to a strain transducer power and signal conditioning circuit 46 wherein the output is developed for further use in the A/D convertor and computer 42. A more detailed discussion of the power and signal conditioning circuit 46 will be had in connection with FIGS. 7A and 7B.

Figure 1:
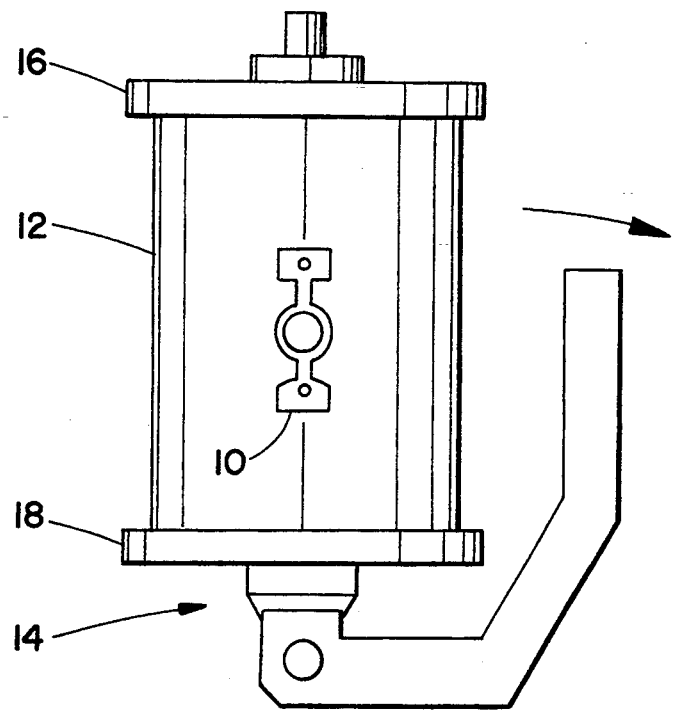
FIG. 1 is a sketch of a prior art calibration device.
Figure 3:
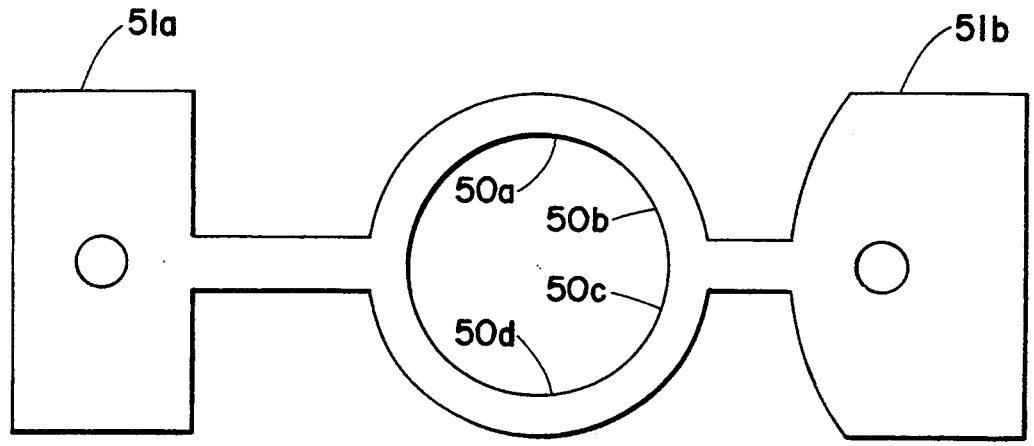
FIG. 3 is a view of the strain transducer arrangement to be calibrated.

Turning to FIG. 3, shown is a strain transducer 10 which is one of the types of transducer which is suitably tested with the subject device. The illustrated strain transducer 10 includes four strain gages 50a, 50b, 50c, and 50d arranged in a bridge network. Such a strain gage arrangement can be adjusted to achieve a balance between resistive natures of each individual strain gage. Attachment points 51a, 51b are used to attach the network to the assembly 20. It is to be appreciated that while FIG. 3 shows one type of arrangement, strain transducers which can be tested take all kinds of forms and shapes.

Figure 4:
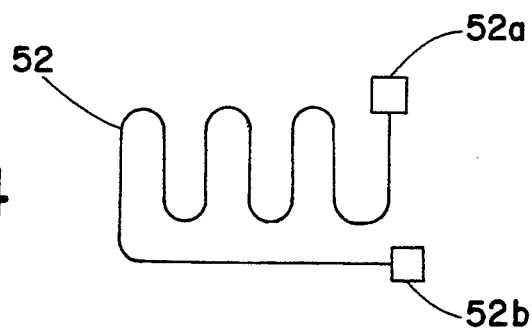
FIG. 4 is a view of an individual strain gage.

FIG. 4 shows an explanatory drawing of a typical strain gage element having a resistance wire 52 and two lead wires 552a, 512b for measuring an output caused by changes in the resistance wire 52. Strain gages and strain transducers are used in industry to accurately measure forces such as weights and compression. A strain gage is firmly attached to a surface of an object which then receives a force. When force is applied to the object, the object either stretches or compresses slightly, thus, distorting the strain gage slightly. Thus, the object either stretches slightly or compresses slightly, depending on whether it feels a tension or compression force. The resistance wire, cemented to the surface of the object, also distorts slightly. The distortion of the wire changes its resistance, which is detected and related to the change of force in the object.

A strain gage measures strain, which is the change in the length of the tensile or compressible object as a percent of its original length. If the wire of the strain gage is stretched slightly, the resistance increases as the length of the wire 52 increases and the cross-sectional area thereby decreases. On the other hand, if the wire 52 is compressed slightly, resistance will decrease as the length will decrease and the cross-sectional area of the wire will increase. Therefore, the resistance of the wire depends on the change in length of the object and can be related to the change in length on a 1:1 basis. The wire 52 of the strain gage as shown in FIG. 4 is zigzagged in order to increase the effective length which comes under the influence of the strain. Metallic strain gages are commonly formed from thin resistance wire or etched from thin sheets of metal foil. It is to be appreciated from the above comments that it is possible to adjust the sections in relation to each other to induce a tension rather than a compression in the transducer.

Figure 5:
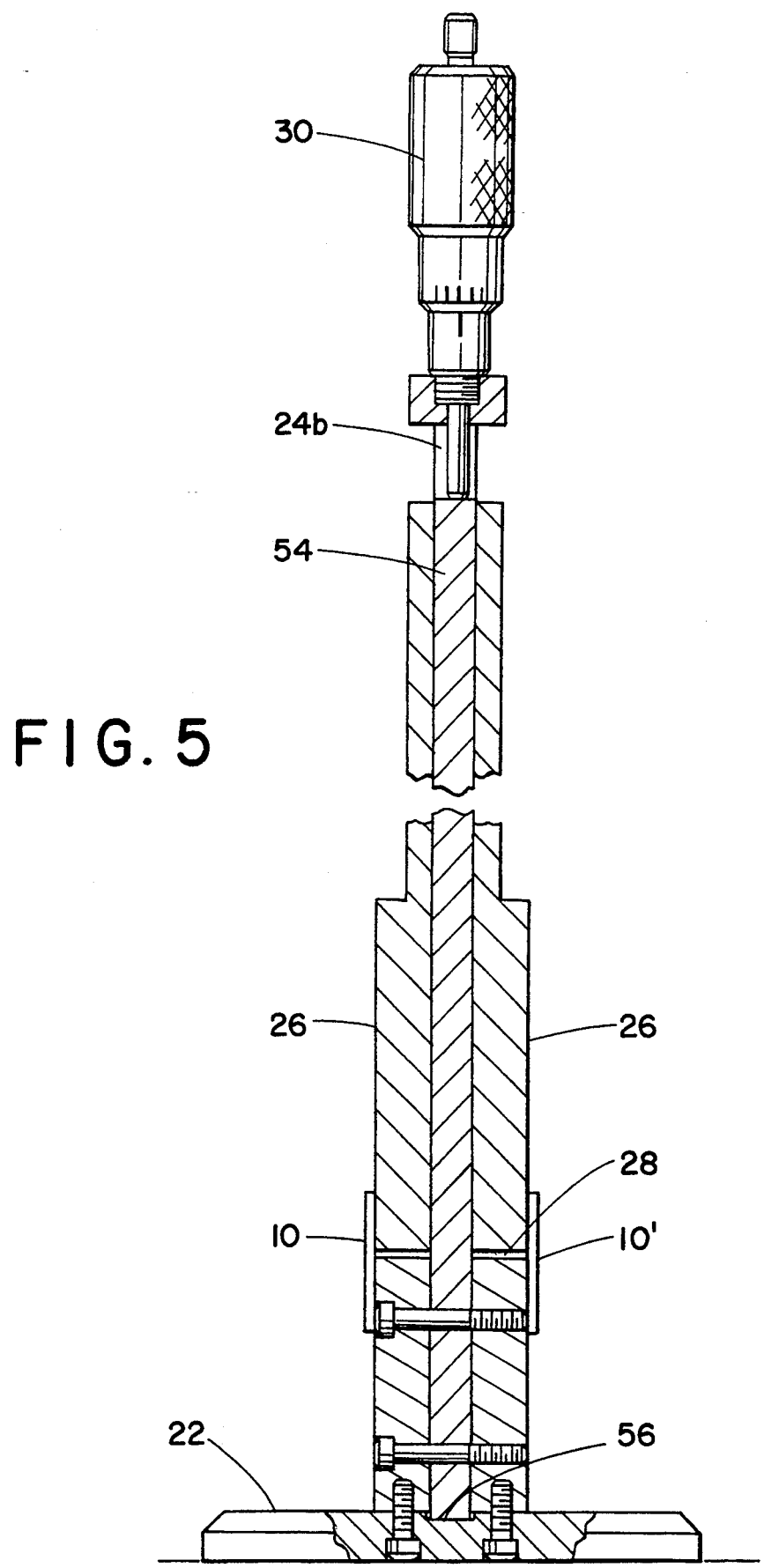
FIG. 5 is a cross-sectional view of the assembly.

Turning to FIG. 5, illustrated is a cross-sectional view of assembly 20. Running through the middle of the assembly is a guide 54 which is secured in base 22 by a guide channel 56. Securing guide 54 in channel 56 provides stability of the device during movement of sliding block 26. Micrometer 30, mounted at the upper portion of sliding block 26, is advantageously used as a precise screw mechanism which applies force to the top of the guide 54 such that sliding block 26 is moved up and down in precise increments. A core post 24b guides sliding block 26 in its movement in a parallel and highly accurate manner. Alternatively, the position of at least one of the sections may be adjusted such that it moves vertically by the use of spring forces. One side of the assembly is the transducer 10 to be tested and on the opposite side is a dummy transducer 10′. The use of two arrangements prevents bending in the transducer which is to be calibrated and binding in the calibration system. It is to be appreciated that dummy transducer 10′ may be replaced by a second transducer 10 which is calibrated with the first transducer.

FIG. 6 provides greater detail to the arrangement of the components surrounding gap 28. The FIGURE shows the arrangement without the strain transducer 10 attached thereto. The cabling which connects to the optical sensor 36 is brought into the assembly through a channel 58 made in post 24. The displacement sensor 36 is advantageously fixed in a recess such that the optical portion of the sensor is directed perpendicularly to the reflective flat surface 26a of sliding block 26. The recess is suitably covered by a face plate 60. By this arrangement, it is possible for the displacement electronics 38 to correlate the amount of displacement of sliding block 26 through operation of micrometer 30.

Figure 7A:
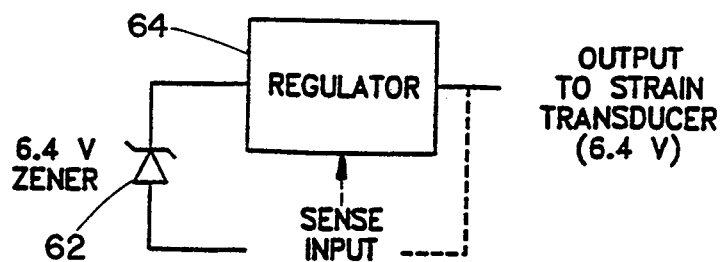
FIGS. 7A and 7B show block diagrams of the strain transducer power supply and signal conditioning circuit shown in FIG. 2.
Figure 7B:
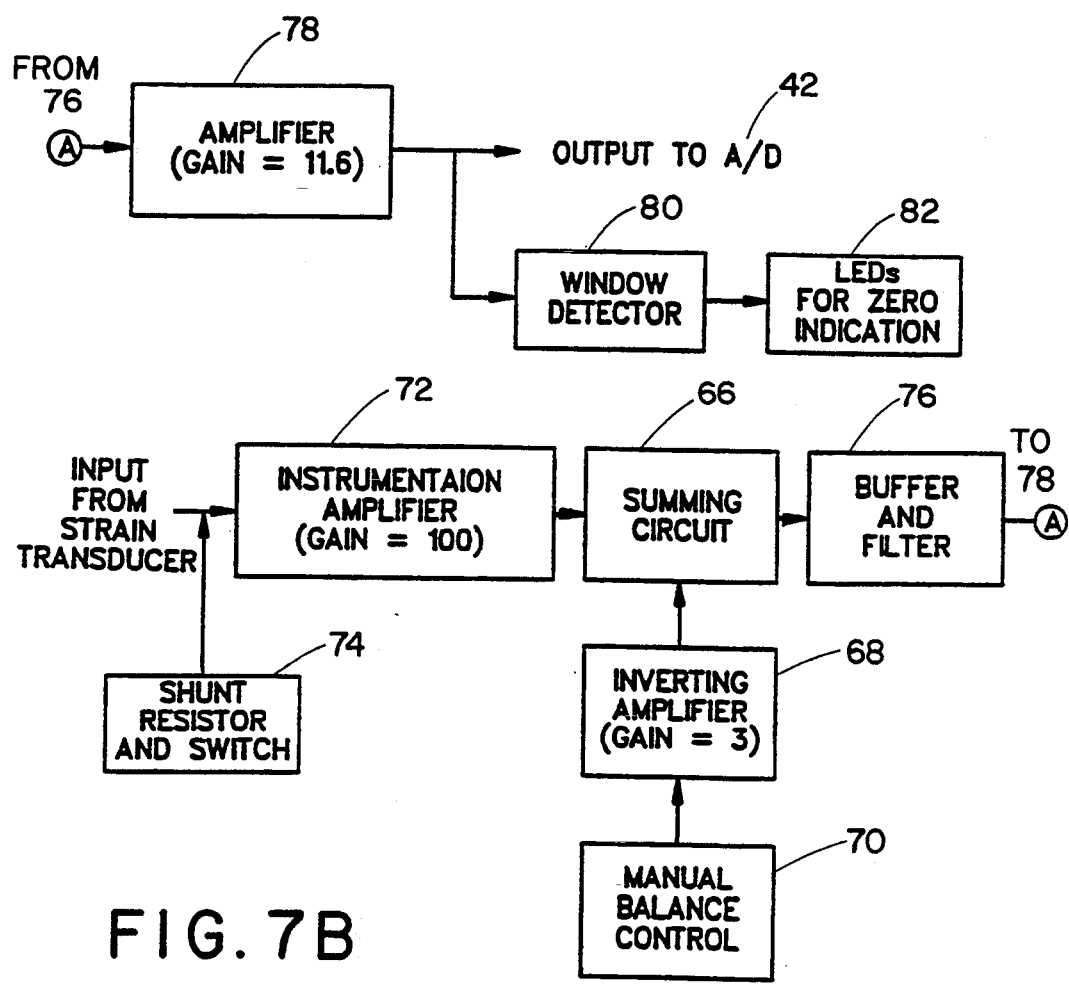

With reference to FIGS. 7A and 7B, a more detailed explanation of the strain transducer power and signal conditioning circuit 46 of FIG. 2 will be discussed. As shown in FIG. 7A, the strain transducer power supply for the strain 10 applies voltage, suitably 6.4V in the preferred embodiment, through zener diode 62 to a regulator 64. The regulator outputs the 6.4V to the strain transducer. A sensing arrangement is included to maintain reliability of the output to the strain transducer 10 by providing feedback to the regulator.

FIG. 7B provides a block diagram detailing the strain transducer signal conditioning portion of circuit 46. A summing circuit 66 receives inputs from an invertor amplifier 68 with a gain suitably set at approximately 3, which receives its input from a manual balance control circuit 70. Summing circuit 66 also receives inputs from an instrumentation amplifier 72 having a gain suitably set at approximately 100. A shunt resistor and switch circuit 74 tests whether the appropriate gain of the amplifiers in the system are proper and whether a voltage of 6.4V is supplied. In the present embodiment, when the shunt resistor and switch are implemented, a reading of 5V for the system should be obtained. If such a reading does not occur, this indicates a problem in the system as to either an improper power supply or improper amplifier gain and correction by an operator will be necessary.

The output from summing circuit 66 is input to a buffer and filter circuit 76 which in turn is sent to an amplifier 78 having a gain suitably set to approximately 11.6. In the present embodiment, the gain of amplifier 78 is adjusted so that the output therefrom is 5V with a 60.4K Ohm and 1% shunt resistor on a 350 Ohm (0.01%) bridge. The output from amplifier 78 is passed to the A/D convertor and computer 42 for calibration. The output is also passed to LEDs 82 through window detector 80 so the operator can easily determine when the output of the transducer arrangement is balanced to zero at the beginning of a calibration process.

Figure 8:
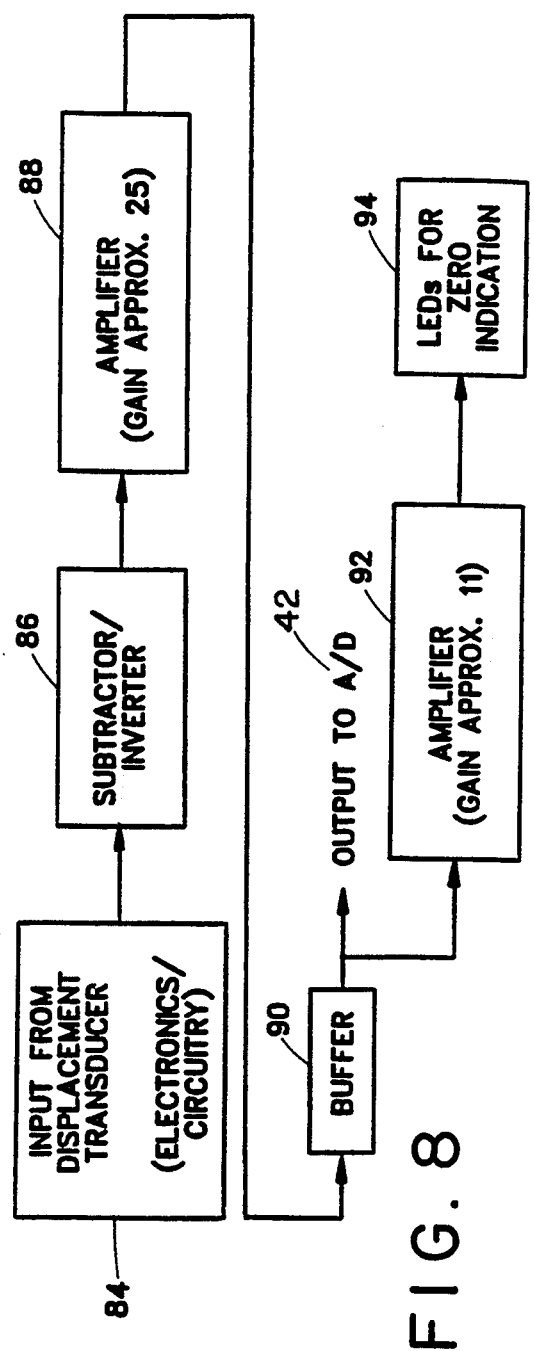
FIG. 8 is a block diagram showing the displacement signal conditioning circuit of FIG. 2.

Turning to FIG. 8, the displacement signal conditioning circuit 40 of FIG. 2 is expanded upon. In particular, the output from the displacement transducer electronics circuitry 38 shown in block 84 is passed to a subtractor and inverter circuit 86 to bring the input signal within a range usable in the present embodiment. This signal is passed to amplifier 88 having a gain suitably of 25. This adjusted signal is passed to buffer circuit 90 which thereafter passes the buffered signal to the A/D convertor and computer 42. An additional output from buffer 90 passes the signal to an amplifier 92 having a gain of approximately 11. When the signal from amplifier 92 is at an appropriate level near zero, a signal is passed to LEDs 94 indicating that a zero condition exists. If the signal from amplifier 92 is not near zero, the signal to LEDs 94 cause an LED to be energized indicating the direction of signal being either positive or negative. Adjustment to the zero output is a convenience in the beginning of a calibration process.

Figure 9:
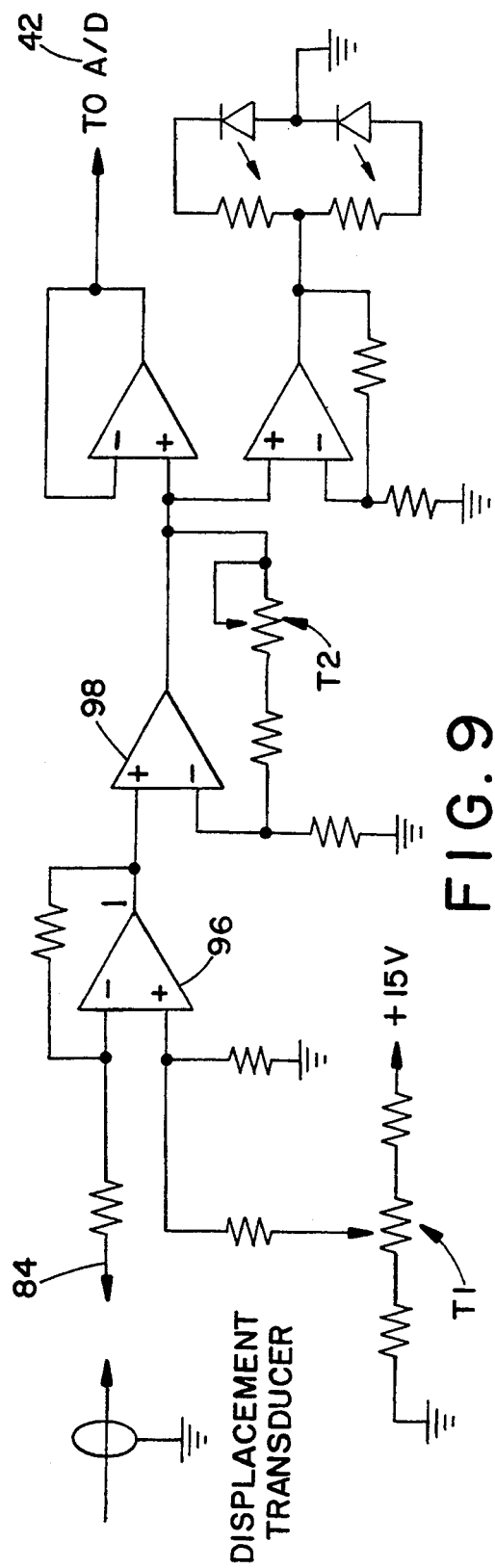
FIG. 9 is a circuit diagram of the displacement signal conditioning circuit of FIG. 8; and, FIG. 10 is a flow chart of the operation of the calibration device.

FIG. 9 shows a circuit diagram of the displacement signal conditioning circuit 40. In this FIGURE, T1 is calibrated so the output from amplifier 96 is 0V when the input to the amplifier is 2.1V. T2 is calibrated so the output of amplifier 98 is 10V when its input is 1.7V. Calibration of the circuit in the preferred embodiment includes adjusting the micrometer 30 so that the displacement electronics at the circuit input 84 is 2.1V DC. Thereafter T1 is adjusted so that pin 1 of amplifier 96 is 0V. The micrometer 30 is again adjusted so the input is 1.7V. At this time, an adjustment of T2 is made so the output of amplifier 98 is 10V. This manipulation sets the system to the appropriate state for calibration of the strain transducer.

Figure 10A:
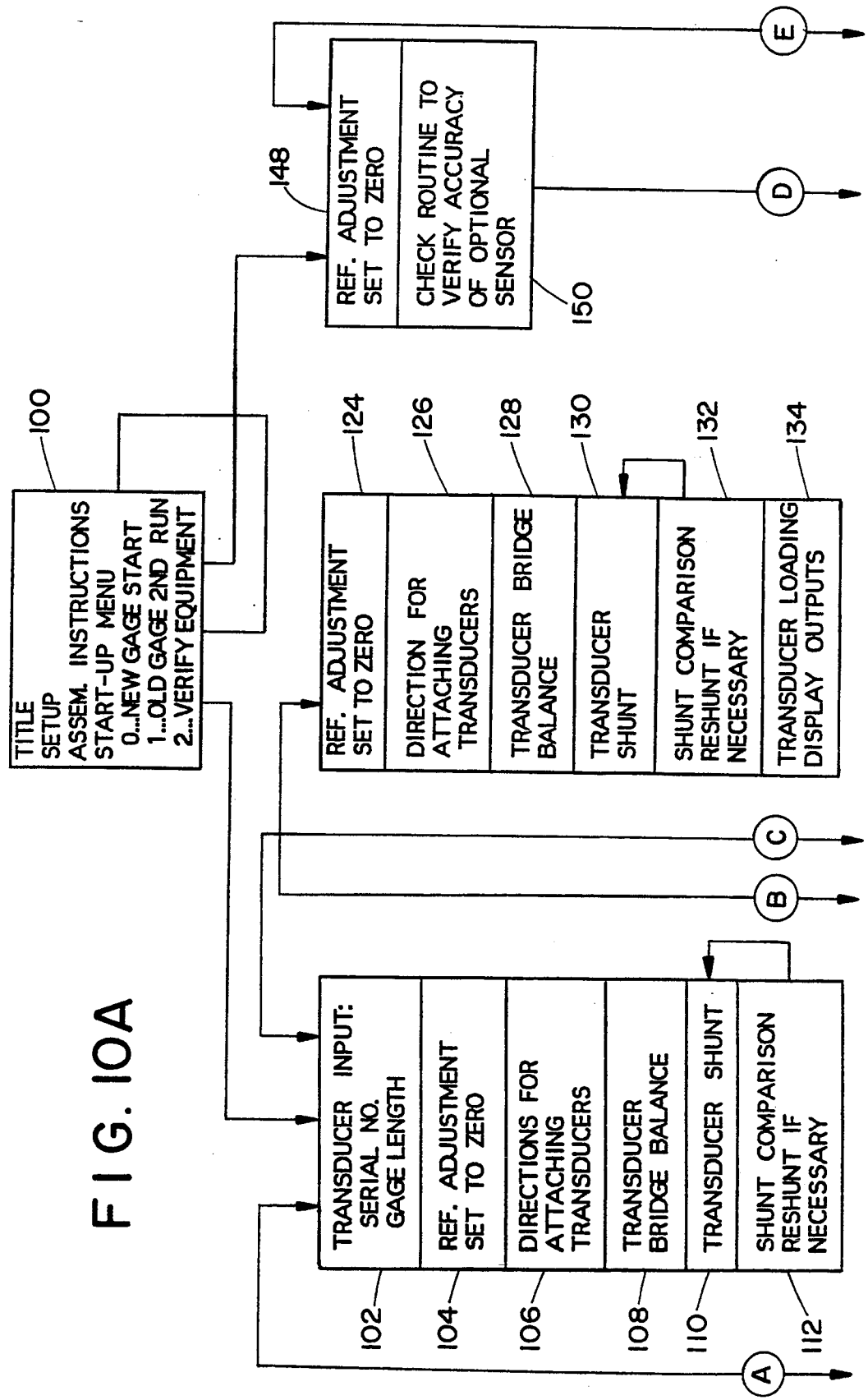

With reference to FIGS. 10A–10B, overall operation of the present device will be discussed.

As shown in step 100, a user, through a computer, selects whether it is a new transducer being calibrated, an old transducer being calibrated, or if a test to verify the calibration equipment is being made. When a new transducer is to be calibrated, the system requests information as to the serial number and length of gage or transducer to be tested. This information is input by the user. The serial number is used thereafter to associate the inputted information with the actual transducer 102.

Next, the reference adjustment is set to zero output 104. In the present embodiment, the reference adjustment is the displacement sensor 36 which is an optical sensor and associated displacement electronics 38. In particular, the output of the signal conditioning circuitry 40, as shown in the circuit of FIG. 9, is adjusted such that the displacement output to the A/D convertor and the LEDs is zero. This adjustment is made by turning the micrometer 30 until both LEDs are off. In terms of the sensor, the adjustment is made to set the gap distance such that it stays in the linear range during the calibration process of the optical sensor displacement.

The user will then be instructed via a display of the computers how to attach the transducer 106. After attachment, it is necessary, according to step 108, to balance the bridge circuit of the strain transducer 10. The balancing of this arrangement produces a zero output from the strain transducer signal and power conditioning circuit 46. An indication of this zero output is shown by the non-energization of the LEDs.

In steps 110 and 112, the shunt resistor and switch circuit 74 is implemented to test whether the proper power is being supplied to the strain transducer 10 and if the proper amplification of the system is obtained. Step 112 provides the capability of repeating the shunt test of step 110. Thereafter, the number of the sample and the maximum allowable transducer voltage input for the transducer being calibrated is entered by the user 114 in order to correlate the output to the particular strain transducer being calibrated.

In step 116, transducer strain loading takes place. Such loading starts from the zero system output. Through operation of the micrometer, the sliding block 26 increases the force on the strain transducer 10 attached across gap 28 up to a predetermined maximum value. As the micrometer is adjusted such that greater force is placed on the transducer 10, a plurality of sampling points are selected and stored to produce calibration results for the transducer under test. In the present embodiment, approximately 10 sample points are taken, but adjustment for more or less sample points is of course possible.

In the present embodiment, the sliding block is approximately 10 lbs. and thus the maximum force applied to each of the strain transducers will be 5 lbs. In the present embodiment, two strain transducers are attached. The first is the test strain transducer 10 to be calibrated and the second is dummy transducer 10' (not shown) attached on the opposite side of the device. Therefore, the force applied to the strain transducer being calibrated is 5 lbs. After reaching a maximum strain, the micrometer is returned to a position such that the output is again zero 118.

A summary of the results of the test, such as transducer factor, statistical offset, and correlation coefficient are presented to the user 120. After the results are summarized for the user, step 122 provides the user with an option to restart the operation, do a second sampling run to average calibration results and an option to verify the accuracy of the equipment.

When selecting a second run to average the calibration results, steps 124–138 are performed which essentially repeat the steps occurring during the first calibration procedure. Step 140 provides the user with the option of combining the previous results with the current results and then plotting a calibration curve in step 142. The option is also presented to the user to not combine the results and to start a new session or to quit the program, 144. It is also possible for the user to combine the results and not plot a calibration curve, but rather to store the results or to simply return to the beginning of the program, 146. The system also provides an equipment verification strategy as set forth in steps 148 and 150.

The present invention has been described for use in a static environment. However, it is to be appreciated that the invention can be used also in an active environment. In particular, rapid movement of the sliding block not controlled by the micrometer can be used to obtain dynamic calibration data.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A device for calibrating a strain gage the device comprising:
   an assembly having a first section and a second section, relative position of the sections defining a gap;
   an attachment means for securing the strain gage to the assembly across the gap;
   an adjustment means for altering the relative position, thereby redefining the gap;
   a displacement means for detecting a displacement signal occurring due to the redefining of the gap;
   a strain gage output detector means for detecting a strain output signal occurring due to the redefining of the gap; and
   a calibrating means for calibrating the strain output signal in relation to the displacement signal.

2. The device according to claim 1 wherein the displacement means is an optical sensor, an output of the optical sensor correlating to a change in a dimension of the gap.

3. The device according to claim 1 wherein a plurality of strain gages are arranged in a bridge network to form a strain transducer.

4. The device according to claim 1 wherein the adjustment means includes a micrometer.

5. The device according to claim 1 wherein the first section includes a sliding block which when adjusted downward induces a strain in the strain gage.

6. The device according to claim 1 wherein the adjustment means is a non-measuring adjustment screw or a magnetic device.

7. The device according to claim 1 wherein the displacement means is a linearly variable displacement transducer, variable capacitance displacement sensor, laser displacement sensor, proximity switch or proximity sensor.

8. The device according to claim 3 wherein the strain transducer is an accelerometer and at least one of the sections is variable in time, the device further including a reference adjustment means for differentiating a measured displacement with respect to time.

9. The device according to claim 1 wherein a dummy strain gage secured to the assembly is replaced by a second strain gage to be calibrated with the strain gage.

10. A device for calibrating a strain transducer, the device comprising:
    a base;
    a post attached to the base at a lower end, and the post having a flat top surface;

a sliding block having a flat reflective bottom surface, the sliding block movably associated with the post, such that a gap is defined between the flat reflective bottom surface of the sliding block and the flat top surface of the post;

a micrometer attached to an upper surface of the sliding block such that operation of the micrometer alters the gap defined by the flat surfaces;

an optical sensor arranged to detect an alteration in the gap caused by the operation of the micrometer and to output a signal representative of the alteration;

an upper attachment means connected to the sliding block, for holding a first portion of the strain transducer;

a lower attachment means connected to the post, for holding a second portion of the strain transducer;

a strain transducer output means, for outputting a signal from the strain transducer when the gap is altered by operation of the micrometer thereby causing a strain force in the strain transducer;

an optical sensor conditioning means for conditioning the signal output by the optical sensor;

a strain transducer conditioning means for conditioning the signal output by the strain transducer; and, a computing means for calibrating the conditioned optical signal and the conditioned strain transducer output.

11. The device according to claim 10 further including:

a guide which passes through a center of the sliding block;

a guide channel located in the post, the guide secured in the guide channel; and, an other transducer attached to the device to assure parallel and non-binding sliding block motion.

12. The device according to claim 11 wherein the micrometer is attached to the sliding block such that operation of the micrometer imparts a force onto the guide thereby assisting in raising and lowering of the sliding block thereby altering the gap.

13. The device according to claim 10 wherein the micrometer measures a displacement of the sliding block.

14. The device according to claim 10 wherein the strain transducer includes a plurality of strain gages formed in a bridge circuit.

15. The device according to claim 10 wherein the computing means are direct read out devices.

16. A method of calibrating a strain transducer using an assembly having a first section and a second section positioned in relation to each other such that a gap is defined between the sections, the position of at least one of the sections being adjustable, the method comprising the steps of:

adjusting a reference displacement means until a reference displacement signal is at a predetermined value;

attaching a first portion of the strain transducer to the first section of the assembly and a second portion of the strain transducer to the second section of the assembly such that the strain transducer is attached to the assembly across the gap;

detecting a strain transducer signal from the strain transducer generated due to adjustments of at least one of the sections, until a strain transducer signal output is at a predetermined value;

adjusting the position of at least one of the sections from the position where the reference displacement signal output is at the predetermined value and the strain transducer signal output is at the predetermined value to a preselected maximum strain position producing a maximum test strain on the strain transducer;

detecting the reference displacement signal output generated by the adjusting of the position of at least one of the sections;

detecting the strain transducer signal output generated by the adjusting of the position of at least one of the sections;

inputting the detected reference displacement signal and the strain transducer signal to a calibrating means; and, calibrating the strain transducer based on the signals inputted to the computing means.

17. The method according to claim 16 wherein the step of adjusting the position of at least one of the sections includes adjusting a micrometer attached to the assembly to provide the adjustment of the position of at least one of the sections.

18. The method of claim 16 wherein when maximum strain is produced on the strain transducer, a force corresponding to half of the weight of one of the sections is applied to the strain transducer.

19. The method according to claim 16 further including the steps of:

inserting a shunt into the strain transducer output detector;

obtaining a shunt output value;

comparing the shunt output value to a predetermined range value;

adjusting the strain transducer output detector when the shunt output value is outside a selected range of the predetermined range value.

20. The method according to claim 16 wherein as the adjustment of at least one of the sections proceeds from a starting position to the position producing the maximum strain on the strain transducer a plurality of sampling points are sampled from the reference displacement signal output and the strain transducer signal output, and are inputted to the calibrating means.

21. The method according to claim 16 further including the steps of:

selecting whether the calibration of the strain transducer is an initial calibration; and, selecting whether calibration of the strain transducer is other than the initial calibration.

22. The method according to claim 21 wherein when the calibration of the strain transducer other than the initial calibration is selected the method further includes combining previous calibration results of the strain transducer.

23. The method according to claim 16 wherein the position of at least one of the sections is adjusted such that it moves vertically by use of spring forces.

24. The method according to claim 16 wherein the transducer to be calibrated is a velocity transducer and at least one of the sections is displaced a measured distance in a measured time.

25. The method according to claim 16 wherein a plurality of strain transducers can be calibrated simultaneously.

26. The method according to claim 16 wherein adjusting the sections in relation to each other induces a tension rather than compression in the transducer.

* * * * *